(12) United States Patent
Waller

(10) Patent No.: US 6,265,980 B1
(45) Date of Patent: Jul. 24, 2001

(54) TIME DELAYED FLUID LEVEL MONITORING DEVICE

(75) Inventor: Clive Waller, Chidlow (AU)

(73) Assignee: Refrigerant Monitoring Systems Pty Ltd., South Perth (AU)

( * ) Notice: Subject to any disclaimer, the term of this patent is extended or adjusted under 35 U.S.C. 154(b) by 0 days.

(21) Appl. No.: 09/254,229

(22) PCT Filed: Sep. 2, 1997

(86) PCT No.: PCT/AU97/00570

§ 371 Date: Mar. 22, 2000

§ 102(e) Date: Mar. 22, 2000

(87) PCT Pub. No.: WO98/10253

PCT Pub. Date: Mar. 12, 1998

(30) Foreign Application Priority Data

Sep. 2, 1996 (AU) ................................................ P02050

(51) Int. Cl.[7] ............................................... G08B 21/00
(52) U.S. Cl. .................... 340/612; 340/618; 340/623;
73/290 R; 73/306; 73/307
(58) Field of Search ................................... 340/612, 618, 340/623; 73/290 R, 305, 306, 307, 309, 314, 322.5, 323

(56) References Cited

U.S. PATENT DOCUMENTS

| 3,552,726 | * | 1/1971 | Kraft ..................... 261/50.1 |
| 3,886,028 | * | 5/1975 | Hindin et al. ............. 156/382 |
| 4,083,387 | * | 4/1978 | Stieber et al. .............. 141/95 |
| 4,523,791 | * | 6/1985 | Belart et al. .............. 303/159 |
| 4,631,375 | * | 12/1986 | McCann ................... 200/84 C |
| 5,526,883 | * | 6/1996 | Breaux ..................... 166/373 |
| 5,680,791 | * | 10/1997 | Joynt ...................... 73/290 R |

FOREIGN PATENT DOCUMENTS

| 52049/64 | 5/1966 | (AU) . |
| 2718295 | 10/1978 | (DE) . |
| 2321662 | 3/1977 | (FR) . |
| 1599697 | 10/1981 | (GB) . |
| WO 83/02824 | 8/1983 | (WO) . |

* cited by examiner

Primary Examiner—Edward Lefkowitz
(74) Attorney, Agent, or Firm—Sheridan Ross P.C.

(57) ABSTRACT

A time delayed fluid level monitoring device (10) for monitoring the level of oil in a compressor sump (not shown) comprises a housing (12) which defines an internal cavity (18). Two orifices (20 and 22) are provided at end (16) of housing (12) to allow fluid communication between the interior of the compressor sump and the cavity (18). Orifice (20) is a restriction hole for restricting the flow of fluid between cavity (18) and the compressor sump so that there is a time delay between the equalization of fluid levels within the compressor sump and cavity (18). Orifice (22) is of a vent hole. A float (24) is pivotally supported within the cavity (18) as provided at one end (28) with a magnet (36) for switching a reed switch (26) extending through the housing (12). If the period of fluctuation of fluid level within the sump between opposite sides of a predetermined level is less than the time delay then the fluid level within cavity (18) will not fluctuate about the predetermined level and therefore float (24) will not move sufficiently to change the state of reed switch (26). If however this fluctuation is maintained for a period greater than the time delay float (24) will pivot to a degree to cause a change in the state of reed switch (26) to reflect the change in oil level within the sump.

10 Claims, 1 Drawing Sheet

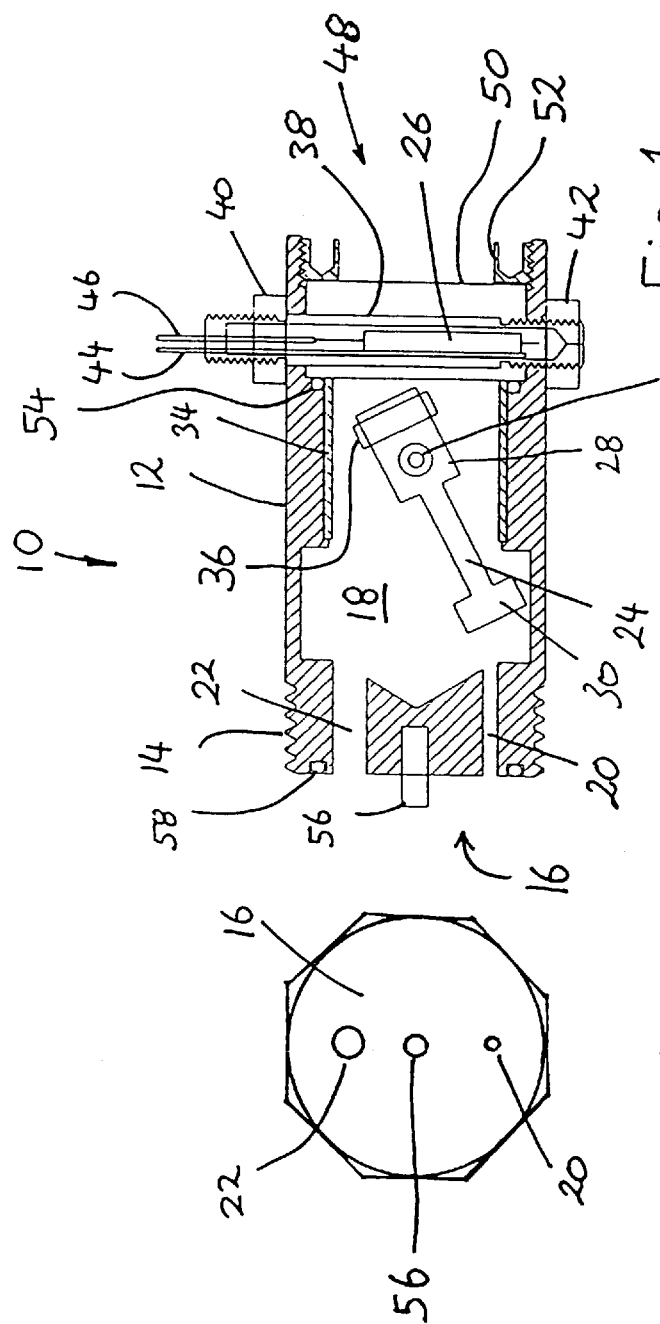
Fig. 1
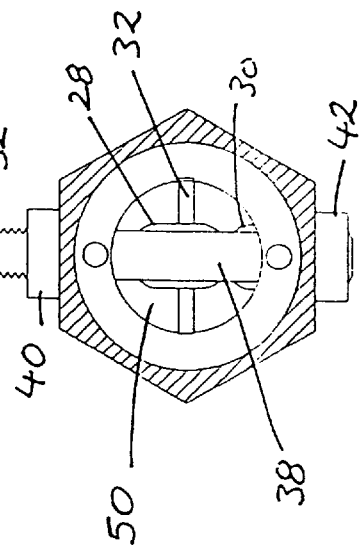
Fig. 2
Fig. 3

US 6,265,980 B1

TIME DELAYED FLUID LEVEL MONITORING DEVICE

FIELD OF THE INVENTION

The present invention relates to a time delayed fluid level monitoring device and in particular, but not exclusively, to a time delayed fluid level monitoring device for monitoring the level of oil in a compressor of a refrigeration system.

BACKGROUND TO THE INVENTION

In most machines and apparatuses which use oil in their operation or for lubrication, it is important to ensure that the oil level does not drop below a predetermined level. Due to the normal operating characteristics of many of these machines and devices, it is common for there to be a temporary drop in the level of oil within a sump although the oil level within the whole machine or apparatus remains at an acceptable level. In such instances, it is not appropriate to provide an alarm or other warning of the drop in oil level. Such an alarm would give the false impression that the overall oil level is inadequate and result in further oil being added which in itself may have adverse effects.

To avoid the above situation, it is known to provide oil level switches or monitoring devices which have in-built electronic time delays. These devices will not give an indication of a low oil level unless the level remains low for a predetermined period of time. However, the electronic implementation of time delays has several inherent problems. One difficulty, relates to the interfacing with the electrical supply associated with the machine or apparatus. For example, in a refrigeration system, the supply voltage may be between 20 volts to 240 volts AC. Also, the frequency of the supply can vary from system to system and country to country. For example, the mains frequency in Australia is 50 hertz whereas in the USA it is 60 hertz. In addition, while electronic circuits can relatively easily provide short time delays using simple capacitor circuits, to produce long time delays digital circuits and/or software control is required. This increases the complexity and costs of the time delay monitoring device.

SUMMARY OF THE INVENTION

It is an object of the present invention to provide a robust and simple time delayed fluid level monitoring device in which the time delay provided is mechanically implemented.

According to the present invention there is provided a time delayed fluid level monitoring device for monitoring the level of a fluid in a vessel comprising:
  a housing adapted for connection to said vessel and defining a cavity, said housing further provided with first and second orifices for allowing fluid communication between said cavity and the interior of said vessel, said first orifice arranged to restrict the flow of fluid between said cavity and said vessel in a manner so that there is a time delay in the equilisation of fluid level in fluid level in said vessel and in said cavity following a change of fluid level in the vessel, said second orifice arranged to provide a vent for said cavity; and,
  means adjustably supported by the housing for providing an indication whether the fluid level in the cavity is above or below a predetermined level, the position of the means being adjustable to allow adjustment of the predetermined level;
  whereby, in use, the indication provided by said means will only change from a current indication if the fluid level in the vessel has been at a level relative to said predetermined level opposite to the current indication for a period of time equal or greater than said time delay.

Preferably said orifices are spaced on opposite sides of said predetermined level.

Preferably the diameter of a lower one of said orifices controls the period of said time delay, such that the time delay varies proportionally with the diameter of the lower orifice.

Preferably said second orifice is of a diameter such that a layer or film of fluid on a face of said housing onto which said second orifice opens cannot bridge said second orifice.

Preferably said means comprises a float pivotally supported in said cavity and a switch activated by said float.

Preferably said switch is magnetically activatable and is retained in a casing which passes through said cavity and is detachably coupled to said housing.

Preferably said casing can be passed through said housing in opposite directions so that said means can be arranged to be in either a normally OFF or normally ON state when said fluid level is below said predetermined level.

BRIEF DESCRIPTION OF THE DRAWINGS

An embodiment of the present invention will now be described by way of example only, with reference to the accompanying drawings in which:

FIG. 1 is a longitudinal section view of the time delayed fluid level monitoring device;

FIG. 2 is a view of one end of the device shown in FIG. 1; and,

FIG. 3 is a view of an opposite end of the device shown in FIG. 1.

DETAILED DESCRIPTION OF PREFERRED EMBODIMENT

Referring to the accompanying drawings, a time delayed fluid level monitoring device 10 for monitoring the level of fluid, for example oil, in a vessel, such as a refrigeration compressor having a sump, (not shown) comprises a non-magnetic housing 12 which is adapted for connection to the compressor sump. A lock nut (not shown) coupled to the compressor sump about a sight glass port of the sump can screw onto a thread 14 formed about the exterior circumferential surface at end 16 of the housing 12, to facilitate this connection. The housing 12 defines a cavity 18. First and second orifices in the form of restriction hole 20 and vent hole 22 are formed in the housing 12 to allow fluid communication between the cavity 18 and the interior of the compressor.

The restriction hole 20 is arranged to restrict the flow of fluid between the cavity 18 and the compressor sump in a manner so that there is a time delay between a change in fluid level in the compressor sump and a change in fluid level in the cavity. That is, there is a delay in the equalisation of fluid levels in the sump and cavity 18 because the rate of filling or emptying of the cavity 18 through the restriction hole 20 is slower than that for the compressor sump to which the device 10 is connected.

Means in the form of a float 24 and switch 26 are associated with the cavity 18 for indicating whether the fluid level in the cavity is above or below a predetermined level. The float 24 is in a form commensurate with that described in the Applicant's International application no.

PCT/AU91/00386 (WO 92/03718) the contents of which is incorporated herein by way of reference. In short, the float 24 is in the form of a solid piece of plastics material in the general shape of a dumbbell but with one end 28 being of greater length than the opposite end 30. The float 24 is pivotally supported on fulcrum pin 32 to a short length of non-magnetic tubing 34 which is press fit into the cavity 18. A rare earth magnetic bar 36 is retained in end 28 of the float 24.

The switch 26 is in the form of a reed switch which is housed within a non-magnetic stem 38 which passes radially through the cavity 18 and is detachably coupled to the housing 12 by nuts 40 and 42 which threadingly engage opposite ends of the stem 38. The vertical position of stem 38 and thus reed switch 26 can be varied by adjustment of the nuts 40 and 42. This provides a mechanism for adjusting the position of the "predetermined fluid level" at which point the reed switch 26 changes state. Control cables 44 and 46 extend from the reed switch 26 to an electronic circuit (not shown) which may include an audible and/or visual alarm.

End 48 of the housing 12 opposite end 16 is sealed by a glass or plastics sight glass or window 50. A nut 52 threadingly engages a thread formed on an inner circumferential surface of the housing 12 at end 48 for pushing the sight glass 50 against an O-ring 54 to seal the cavity 18. In this embodiment, the sight glass 50 is provided with a hole extending along its diameter through which the stem 38 can pass.

A sacrificial magnet 56 is embedded in and extends from end 16 of the housing 12.

O-ring 58 is provided in a recess formed in end 16 to seal that end to the compressor.

The operation of the monitoring device 10 will now be described with reference to a refrigeration system.

Most compressors in refrigeration systems are fitted with a sight glass to allow visual inspection of the oil level within. The device 10 ideally would be fitted to the compressor by simply removing the sight glass and using a locking nut to bolt end 16 onto the compressor. The use of a lock nut allows the housing 12 to be orientated so that the restriction hole 20 and vent hole 22 are arranged in a substantially vertical line with the restriction hole 20 being lowermost. Both the restriction hole 20 and vent hole 22 allow fluid communication between the cavity 18 and the compressor sump, depending on the oil levels in the cavity 18 and compressor sump. Accordingly, assuming that the oil level within the compressor sump remains the same (and is above the level of hole 20) for an extended period of time, the oil level within both the cavity 18 and compressor will equalise to be the same. The amount of oil within the cavity 18 will determine the position of the float 24 and thus the OPEN/CLOSED state of the reed switch 26. The monitoring device 10 can be arranged so that provided the oil level within the cavity 18 is below a predetermined level, the reed switch is either normally CLOSED or normally OPEN. For the sake of the following description, it is assumed that when the oil level within the cavity 18 is below a predetermined level, the reed switch will be CLOSED and when above the predetermined level, the reed switch will be normally OPEN.

The time taken for oil to flow into and out of the cavity 18 is dependent on the diameter of the restriction hole 20. Thus, the time delay provided by the monitoring device 10 can be set by forming the restriction hole 20 to have a particular diameter. The diameter should be set so that the time delay is greater than the period of normal oil level fluctuations within the compressor. For example, at start-up of a refrigeration system, the oil level within the compressor may drop below a predetermined level for a period of several seconds or several minutes and then stabilise at a higher level. The time delay produced by the restriction hole 20 should be greater than the time within which stabilisation would normally occur.

The vent hole 22 should be of a diameter greater than that which could be blocked or otherwise sealed by a film of oil across end 16 of the housing 12. If the vent hole were to become blocked by a film of oil, it would not be possible for oil to enter or leave the cavity 18 through restriction hole 20. When used, in a refrigeration environment, the vent hole 22 may typically be in the order of 3 mm to 5 mm in diameter.

Say that the oil level in the compressor sump is above a predetermined level and has been at that level for an extended period of time. The oil level within the cavity 18 will be at the same level and the float 24 will be pivoted about fulcrum pin 32 to a position so that the reed switch 26 is OPEN. Thus the monitoring device 10 will indicate that the oil level within the compressor is above the predetermined level. If the oil level within the compressor now drops to below the predetermined level, oil within the cavity 18 will drain via restriction hole 20 back into the compressor. If the rate of flow of oil from the cavity 18 through hole 20 is such that the oil level within the cavity 18 does not drop below the predetermined level prior to the oil level within the compressor returning to a level above the predetermined level, then the state of the reed switch will not change and thus for example and alarm condition will not be indicated. For example, if the oil level within a compressor dropped from above the predetermined level to below the predetermined level and then returned again to above the predetermined level within a period of one minute but the time taken for the oil within the cavity 18 to bleed from the restriction hole 20 to below the predetermined level takes two minutes, the temporary drop in oil level within the compressor will not show up as an alarm condition. However, if the oil level within the compressor dropped from above the predetermined level to below the predetermined level and stayed at that level for a period greater than two minutes, the oil within the cavity 18 will have sufficient time to drain through restriction hole 20 to a level below the predetermined level which will cause the float 24 to pivot about fulcrum pin 32 in an anticlockwise direction to an extent so as to CLOSE the reed switch 26 and thereby indicate an alarm condition.

The sacrificial magnetic 56 is provided to attract magnetic fragments from the oil which are present due to the normal operation of the compressor. This prevents a build-up of material on the magnet 36.

Now that an embodiment of the invention has been described in detail, it will be apparent to those skilled in the relevant arts that numerous modifications and variations may be made without departing from the basic inventive concepts. For example, the float 24 and reed switch 26 are used to indicate the actual level of oil within the cavity 18. However any other type of measurement or sensor means can be used. Also, although only one restriction hole 20 and one vent hole 22 are shown, a plurality of one or both of these holes can also be provided. As described above, the monitoring device 10 can be arranged to be in a normally OFF or normally ON state by passing the stem 38 in opposite directions through the cavity 18. However, this can also be achieved by forming the housing 12 in two separate but connected parts so that end 16 containing the restriction hole 20 and vent hole 22, and the remainder of the housing, can be rotated relative to each other along a longitudinal axis of the housing 12. This will allow the orientation of the holes 20 and 22 to remain the same while the remainder of the housing can be rotated by 180°. Further, while the present embodiment is described with reference to a refrigeration system, it may be used in any other system which uses a fluid for its operation.

All such modifications and variations are deemed to be within the scope of the present invention the nature of which is to be determined from the foregoing description and appended claims.

What is claimed is:

1. A time delayed fluid level monitoring device for monitoring the level of a fluid in a vessel comprising:

a housing adapted for connection to said vessel and defining a cavity, said housing further provided with first and second orifices for allowing fluid communication between said cavity and the interior of said vessel, said first orifice arranged to restrict the flow of fluid between said cavity and said vessel in a manner so that there is a time delay in the equilisation of fluid level in fluid level in said vessel and in said cavity, following a change of fluid level in the vessel, said second orifice arranged to provide a vent for said cavity; and, means adjustably supported by the housing for providing an indication as to whether the fluid level in the cavity is above or below a predetermined level, the position of the means being adjustable to allow adjustment of the predetermined level;

whereby, in use, the indication provided by said means will only change from a current indication if the fluid level in the vessel has been at a level relative to said predetermined level opposite to the current indication for a period of time equal or greater than said time delay.

2. A monitoring device according to claim 1, wherein said orifices are spaced on opposite sides of said predetermined level.

3. A monitoring device according to claim 2, the diameter of a lower one of said orifices controls the period of said time delay, such that the time delay varies proportionally with the diameter of the lower orifice.

4. A monitoring device according to claim 3, said second orifice is of a diameter such that a layer or film of fluid on a face of said housing onto which said second orifice opens cannot bridge said second orifice.

5. A monitoring device according to claim 4, said means comprises a float pivotally supported in said cavity and a switch activated by said float.

6. A monitoring device according to claim 5, said switch is magnetically activatable and is retained in a casing which passes through said cavity and is detachably coupled to said housing.

7. A monitoring device according to claim 6, said casing can be passed through said housing in opposite directions so that said means can be arranged to be in either a normally OFF or normally ON state when said fluid level is below said predetermined level.

8. A monitoring device according to claim 7, further comprising a sight glass sealed coupled to an end of said housing opposite said orifices and through which the cavity can be viewed.

9. A monitoring device according to claim 8, wherein said casing extends through said sight glass.

10. A monitoring device according to claim 9, further comprising a sacrificial magnet attached to an end of said housing in which said orifices are formed and located so that fluid flowing from said vessel into said cavity passes said sacrificial magnetic prior to entry into said cavity.

* * * * *